INVENTORS
BENJAMIN SENITSKY
HERBERT W. BOMZER

ATTORNEY

United States Patent Office 2,994,966
Patented Aug. 8, 1961

2,994,966
SYSTEM FOR PREDICTING RADAR TERRAIN REFLECTION
Benjamin Senitsky, Murray Hill, N.J., and Herbert W. Bomzer, New Hyde Park, N.Y., assignors to Sperry Rand Corporation, Ford Instrument Company Division, Long Island City, N.Y., a corporation of Delaware
Filed Mar. 13, 1957, Ser. No. 645,864
1 Claim. (Cl. 35—10.4)

This invention relates to a system and method for predicting the shading effect observed on the screens of radar devices while being empolyed to scan land areas.

Heretofore, radar simulator design has been predicated on the analogous character of the instrument for which operators were to be trained. Previous simulators, for example, required three dimensional input data. The simulation techniques and apparatus contemplated by this invention is generally applicable regardless of the type radar device which is anticipated for actual use. The invention relies on the physical behavior of electromagnetic propagation which is essential to the operability of all known radars. Because of the peculiar nature of wave propagation it is possible for radar operators to gain information as to the topographical features of the reflecting land target. It is an object of this invention to provide a system and method for predicting this shading effect which will appear on the scope as a result of the change in slope of the reflecting terrain during the scan.

Generally the system which is employed to carry out the prediction method comprises a computer which is used to predict that amount of power or energy returned to the antenna of a radar device while it is scanning a land area and an indicator operatively associated with the computer which will correlate its output with varying levels of the color grey as displayed on radar screens presenting actual terrain reflections.

A more detailed description of the preferred embodiment of the invention is presented below which should be read in conjunction with the accompanying drawings, in which FIG. 1 is a polar grid map such as might be produced by the trainer;

Figure 1:
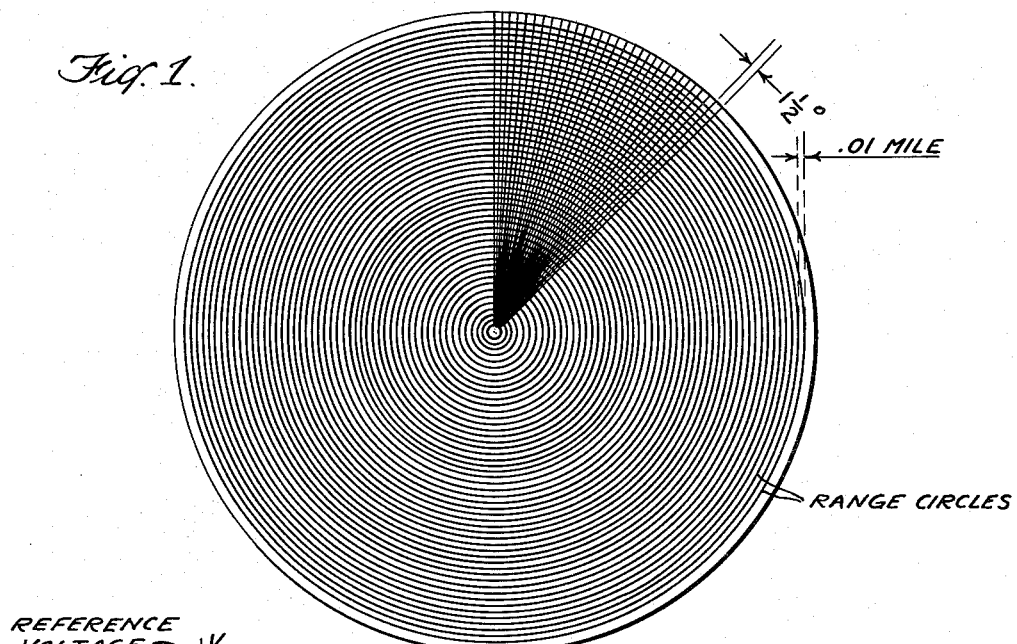

A predicted radar type pattern of the position plan indicator type as shown in FIG. 1 may be directly prepared with the aid of the invented system, being essentially a polar grid map with range circles at discrete intervals, scaled for example to .1 mile and radial lines at 1½ degrees angular displacement as swept out by the spot on a cathode ray tube. As a simulated radar presentation of a given area of terrain, the unit areas on the polar grid should be painted in varying levels of grey or grey levels of some other color so as to give a realistic indication of the topography of the terrain in the same manner as this indication is effected on ordinary radar screens.

Topographical indication in radar can be made a function of the power received by the antenna as determined by the slope of the reflecting land target. As shown in the drawings there are means for predicting power returned to radar antenna on the basis of assigned radar positions and terrain geometry which may be obtained from contour and geological survey maps. One computer employed by the indicating system mechanizes the following formula:

$$P_r = K \sin \frac{\theta_1 \cos^2 \theta_2}{R^3 \cos^2 \theta_1 \sin \theta_2}$$

where K is a proportionality constant, $P_r$ is the energy received at the antenna from selected area on the target, $\theta_1$ is the angle between the line of sight or slant range $r$ and the vertical, $\theta_2$ is the angle between the line of sight and the normal to the terrain target and R is the target range which is the horizontal distance between the simulated position of the antenna and the target.

Figure 2:
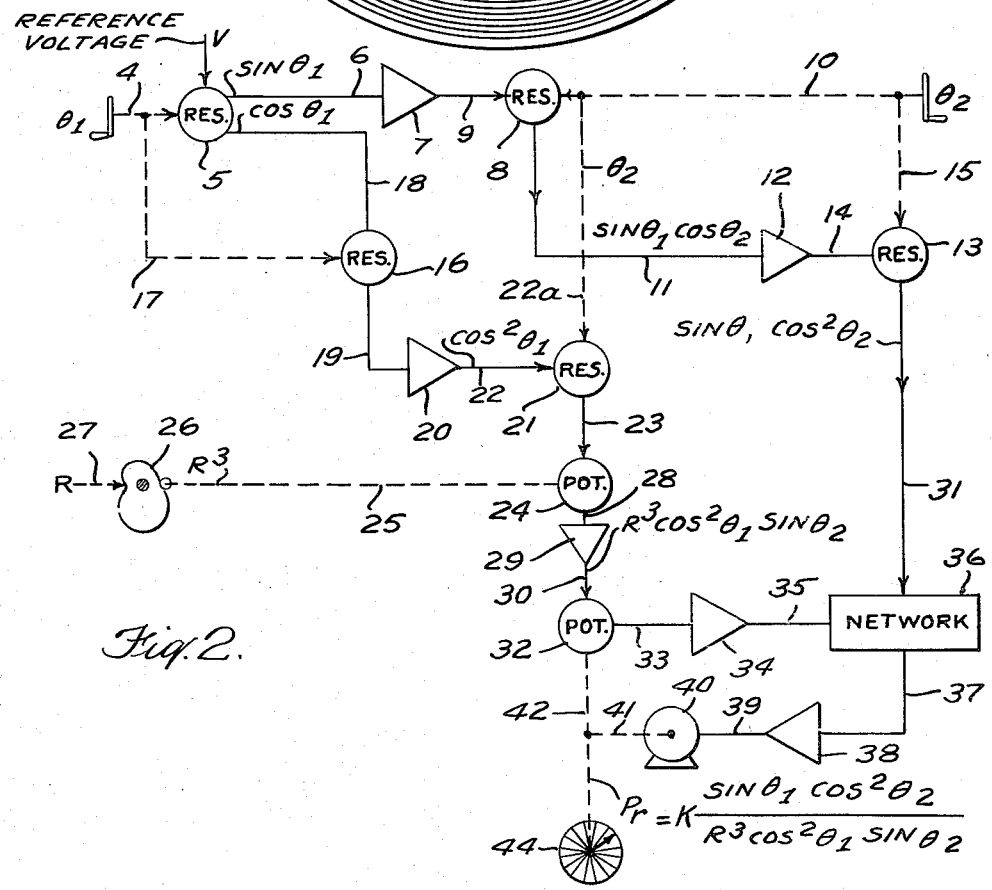
FIG. 2 shows schematically a computing apparatus deigned to determine power received by a radar antenna according to the slope of the reflecting target.

According to FIG. 2 the computing component of the indicating system has an input shaft 4 settable in accordance with the angle $\theta_1$, which is connected to sine-cosine resolver 5 into which is fed a reference voltage V. Lead 6 connects the resolver 5 to an amplifier 7 whose output is placed into resolver 8 by means of lead 9. The resolver 8 is connected to shaft 10 on which is placed the input $\theta_2$ and the output, $\sin \theta_1 \cos \theta_2$, of the resolver 8 on lead 11 is amplified by amplifier 12 and placed into cosine resolver 13 on amplifier output lead 14. The cosine resolver 13 is driven by shaft 15 which is connected to shaft 10 receiving therefrom the angular input $\theta_2$.

A cosine resolver 16 is connected to the shaft 4 and resolver 5 by means of shaft 17 and lead 18 to receive the quantities $\theta_1$ and $\cos \theta_1$ respectively. The resolver 16 computes the quantity $\cos^2 \theta_1$ and this output is placed on input lead 19 of amplifier 20 from which the quantity is introduced to resolver 21 by lead 22.

The shaft 10 is also connected to the resolver 21 through shaft 22a which feeds the quantity $\theta_2$ thereto. The resolver 21 is adapted to determine the quantity $\cos^2 \theta_1 \sin \theta_2$ which is placed on output lead 23. Potentiometer 24 is energized by the lead 23 and is driven by shaft 25 which is operated as a cam follow up by cam 26. A shaft 27 settable in accordance with range R is in driving connection with the cam 26 which is employed to cube the input on shaft 27. The output $\sin \theta_1 \cos^2 \theta_2$ of the potentiometer 24 and the output $\cos^2 \theta_1 \sin \theta_2$ of resolver 13 are placed into a dividing servo loop system by means of potentiometer lead 28, amplifier 29 and lead 30, and leads 31, respectively. The servo system comprises in series a potentiometer 32 energized by the lead 30, potentiometer output lead 33, amplifier 34, lead 35, network box 36 which is also connected to the lead 31, lead 37, amplifier 38, lead 39, servo motor 40, motor shaft 41 which is connected to feedback shaft for the potentiometer 32. When the system is nulled, there results the computed quantity $P_r$ representing energy returned to the antenna from a selected area on the target terrain.

With the aid of the contour map the geometrical inputs R, $\theta_1$ and $\theta_2$ may be selected for all points of intersection of the range circles and radial lines on the polar grid assuming a selected aerial antenna position. Polar grid information of this character may then be obtained for other aerial positions so as to give a complete presentation of the area during a simulated run over the target.

In order to make the conversion from power return to its correlated grey level, an indicator 44 is provided. The indicator pointer is driven by shaft 42, the indicator being in effect color calibrated according to degree of power return which may be read directly by the one charged with the manual preparation of the polar grid presentation. The information obtained from the indicator 44 can thereby be employed as a guide in hand painting the predicted radar pattern on the polar grid or as a signal control for brightness on a cathode ray tube. Obviously the conversion from power return to a corresponding color indication could be made more directly by employing the output of the computer to process a video signal of a cathode ray tube which could be viewed in varying shades according to the slope of the instant target in the same manner as on an actual radar receiver screen.

Figure 3:
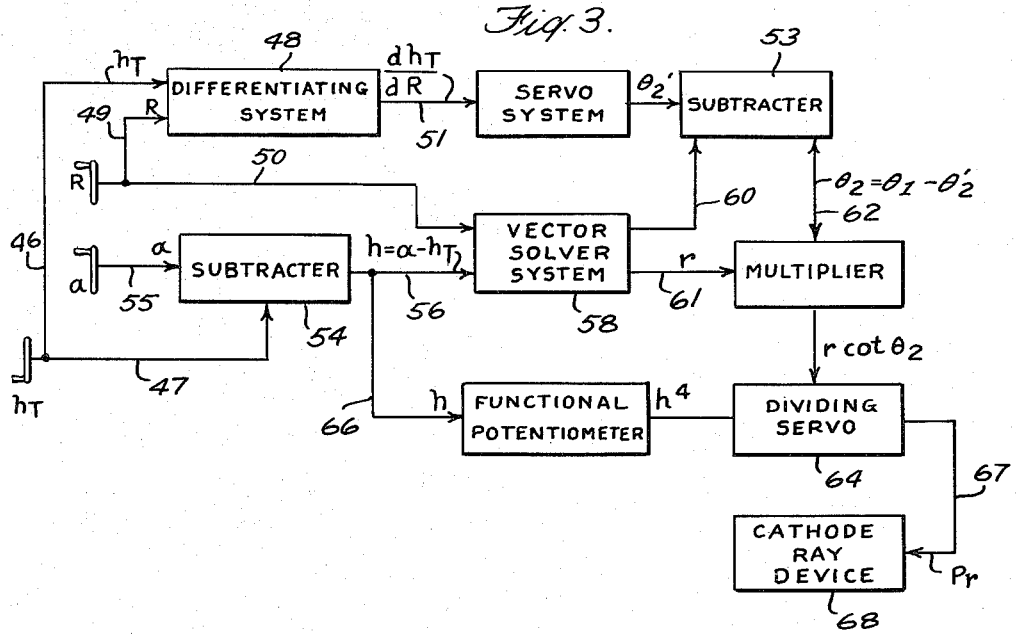
FIG. 3 shows schematically a modified computing apparatus for determining antenna power return.
Figure 4:
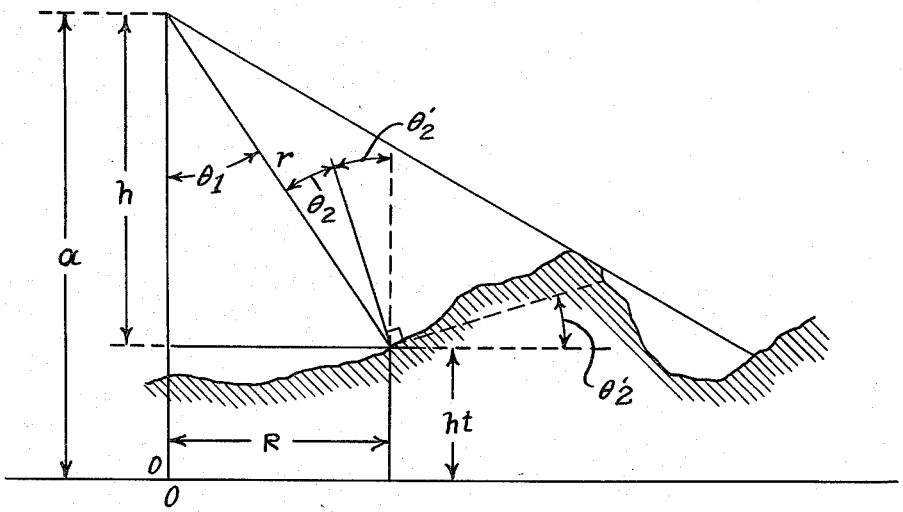
FIG. 4 is a diagram illustrating the various parameters employed by the computer.

As shown in FIG. 3, power return may be computed by a device which mechanizes a slightly different formula, namely $$P_r = K \frac{r \cot \theta_2}{h^4}$$

where $h$ is the assigned altitude of the radar above the target and $r$ is slant range. This formula is mechanized as follows:

Shaft 46 is settable in accordance with the quantity $h_t$ and is driven by input shaft 47. The shaft 46 is connected to a differentiator 48 into which there is set range R by means of shaft 49 which is driven by range shaft 50. The output $$\frac{dh_t}{dR}$$

of the differentiator on shaft 51 is servoed by servo system 52 as the angle $\theta^1{}_2$ to a mechanical subtractor 53.

A second subtractor 54 having an input shaft 55 settable in accordance with the assumed height of the radar above sea level, $\alpha$, the output shaft 47 on which appears the input $h_t$, and an altitude shaft 56 is employed to introduce to vector solver 58 the subtracted quantity, $\alpha - h_t$. The range shaft 50 is also connected to the input side of the vector solver which computes the angle $\theta_1$ appearing on shaft 60 and the slant range $r$ appearing on the shaft 61.

Accordingly there is represented on the output shaft 62 of the subtractor 53 the quantity $\theta_1 - \theta^1{}_2$ or $\theta_2$ which is set into multiplier 63 which also receives slant range $r$ on the shaft 61. The multiplier computes the quantity $r \cot \theta_2$ which is placed into one side of dividing servo 64 by means of shaft 65. A functional potentiometer connected to the altitude shaft 56 by shaft 66 places the quantity $h^4$ into the other side of the dividing servo 64. Output shaft 67 of the dividing servo conveys the computed quantity $P_r$ to a cathode ray device 68 which in effect correlates the mechanical quantity $P_r$ to a screen presentation having grey shading in the manner of a radar scope presentation.

According to the method of invention then the procedure for obtaining the desired prediction is as follows: compute antenna power return by a computing device such as is described above for an assigned radar position and for each point of intersection of the radial lines and range circles on a polar grid, correlate each computed quantity to a color grey level or voltage and apply the correlated color or voltage to a simulated radar scope presentation such as the polar grid itself or a cathode ray tube screen. Additionally the presentation may be photographed slightly defocused and reduced in size so as to yield a realistic picture of the land area as would be actually observed on a radar scope. The result is the prediction. This procedure may be repeated for successive frames to obtain a series of pictures for a simulated flight over the selected land area.

It is understood that various modifications may be made in the computing and color conversion units without departing from the scope of the invention as defined by the appended claim.

What is claimed is:

A system for predicting radar terrain reflection comprising a computer for arithmetically calculating the signal strength of radiant energy waves hypothetically reflected from objects situated in a known terrain for an assumed radar position relative to said terrain, said computer including means for employing quantities which are analogs of angles defined by the line of sight from the assumed radar position to the terrain objects and the normal to the said terrain objects and means for correlating the calculated signal strength with chromatic indications for use in a simulated radar pattern.

References Cited in the file of this patent

UNITED STATES PATENTS

| | | |
|---|---|---|
| 2,405,591 | Mason | Aug. 13, 1946 |
| 2,426,189 | Espenschied | Aug. 26, 1947 |
| 2,428,351 | Ayres | Oct. 7, 1947 |
| 2,543,753 | Ayres | Mar. 6, 1951 |
| 2,737,730 | Spencer | Mar. 13, 1956 |